US008011769B2

(12) United States Patent
Li et al.

(10) Patent No.: US 8,011,769 B2
(45) Date of Patent: Sep. 6, 2011

(54) SEAL PART FOR INK CARTRIDGE OF INKJET PRINTER

(75) Inventors: Dongfei Li, Guangdoon (CN); Yi Zhou, Guangdoon (CN)

(73) Assignee: Zhuhai Ninestar Management Co., Ltd., Guangdong (CN)

( * ) Notice: Subject to any disclaimer, the term of this patent is extended or adjusted under 35 U.S.C. 154(b) by 699 days.

(21) Appl. No.: 11/883,468

(22) PCT Filed: Jan. 18, 2006

(86) PCT No.: PCT/CN2006/000072
§ 371 (c)(1),
(2), (4) Date: Jun. 6, 2008

(87) PCT Pub. No.: WO2006/076858
PCT Pub. Date: Jul. 27, 2006

(65) Prior Publication Data

US 2009/0009572 A1 Jan. 8, 2009

(30) Foreign Application Priority Data

Jan. 19, 2005 (CN) ...................... 2005 2 0053897 U

(51) Int. Cl.
*B41J 2/175* (2006.01)
*F16L 17/00* (2006.01)

(52) U.S. Cl. ......................................... 347/86; 277/626

(58) Field of Classification Search .................... 347/85, 347/86; 215/247; 277/626, 627; 604/88, 604/414
See application file for complete search history.

(56) References Cited

U.S. PATENT DOCUMENTS

| | | | | |
|---|---|---|---|---|
| 4,253,103 | A * | 2/1981 | Heinzl et al. | 347/86 |
| 4,928,126 | A * | 5/1990 | Asai | 347/86 |
| 6,238,042 | B1 * | 5/2001 | Kobayashi et al. | 347/86 |
| 6,682,183 | B2 * | 1/2004 | Jones et al. | 347/85 |
| 6,908,184 | B2 * | 6/2005 | Shinada et al. | 347/86 |
| 7,533,976 | B2 * | 5/2009 | Ogle et al. | 347/86 |

* cited by examiner

*Primary Examiner* — Anh T. N. Vo
(74) *Attorney, Agent, or Firm* — J.C. Patents

(57) ABSTRACT

A seal part for an ink cartridge of an inkjet printer including a seal end for sealing an ink outlet port of the ink cartridge is provided. The seal part is column-shaped, a cylindrical cavity exists inside the seal part, and a diameter of the cavity is greater than a diameter of an ink supply needle of the printer. The seal end for sealing the ink output port of the ink cartridge is a cylindrical surface, or is a cylindrical surface having at least a circle of sealing flange. One end surface is a closed plane for preventing the ink from flowing out from the ink outlet port after the ink cartridge is detached from the printer, and the other end surface is a plane with an aperture in the center. The size of the aperture is adequate to seal the ink supply needle of the printer. The seal part seals the ink supply needle of the printer after the ink cartridge is installed in the printer, and prevents the ink leakage after the ink cartridge is detached from the printer.

3 Claims, 1 Drawing Sheet

SEAL PART FOR INK CARTRIDGE OF INKJET PRINTER

BACKGROUND OF THE INVENTION

1. Field of Invention

The present invention relates to a seal part for an ink cartridge of an inkjet printer.

2. Description of Related Art

Currently, the seat part of a micro piezoelectric ink cartridge on market provides the function of sealing an ink supply needle of the printer only, and cannot prevent ink from flowing out from an ink outlet port after the ink cartridge is detached from the printer. In order to realize the above mentioned function, a valve mechanism of the ink outlet port, including an elastic element and a valve core, must be added. Thus, the number of the parts in the ink cartridge is increased, and the assembly process is complicated, resulting in the increase of the use cost of the ink cartridge.

SUMMARY OF THE INVENTION

In view of the above problems and defects of the conventional seal part structure of the conventional ink cartridge, the present invention is directed to provide a seal part for an ink cartridge of an inkjet printer, which seals an ink supply needle when the ink cartridge is installed in the printer, and prevents ink from flowing out from an ink outlet port when the ink cartridge is detached from the printer.

A seal part for an ink cartridge of a printer comprises a seal end for sealing an ink outlet port of the ink cartridge, wherein the seal part is column-shaped, a cylindrical cavity exists inside the seal part, and a diameter of the cavity is greater than a diameter of an ink supply needle of the printer.

The seal end for sealing the ink outlet port of the ink cartridge is a cylindrical surface, one end surface of the seal end is a closed plane for presenting the ink from flowing out from the ink outlet port after the ink cartridge is detached from the printer, and the other end is a plane with a aperture in the center, and the size of the aperture is adequate to seal the ink supply needle of the printer.

The seal end for sealing the ink output port of the ink cartridge has at least one circle of sealing flange on the cylindrical surface, one end surface of the seal end is a closed plane for preventing the ink from flowing out from the ink outlet port after the ink cartridge is detached from the printer, and the other end is a plane with a aperture in the center, and the size of the aperture is adequate to seal the ink supply needle of the printer.

A material of the end surface b, the closed plane, or at least a portion of the closed plane that allows the ink supply needle to pass through is elastic and retractable, for example, is an elastic material such as rubber and silicone, which ensures that when the ink cartridge is detached from the printer, the portion through which the ink supply needle passes is closed automatically, so as to prevent the ink from leaking from the ink outlet port.

As the present invention adopts the technical scheme described above, the structure of the seal part is very simple. When the ink cartridge is installed in the printer, the seal part seals the ink supply needle of the printer. Also, when the ink cartridge is detached from the printer, the seal part prevents the ink from leaking from the ink outlet port. The assembly process of the present invention is quite simple, and the cost for the ink cartridge is reduced.

DESCRIPTION OF EMBODIMENTS

The present invention is further explained with reference to the detailed description of the embodiment and the accompanying drawings.

Figure 1:
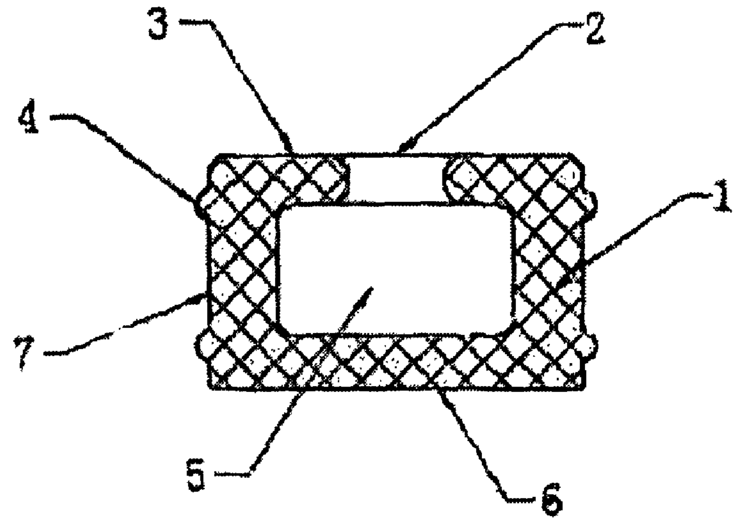
FIG. 1 is a sectional view of the seal part of the present invention.
Figure 2:
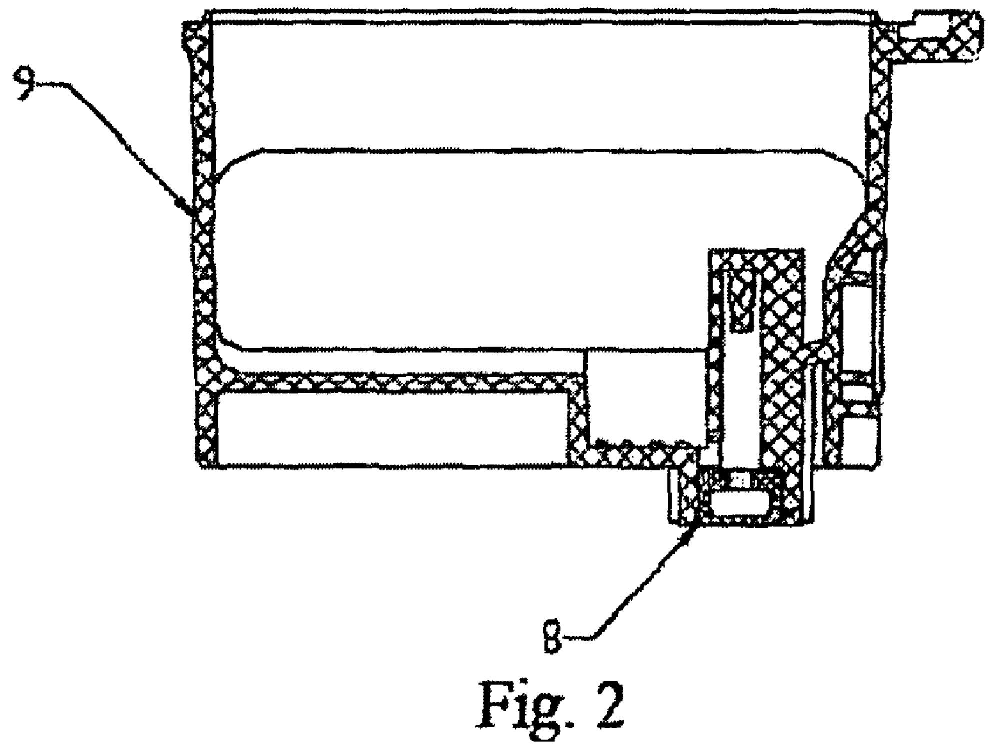
FIG. 2 is a sectional view of the seal part of the present invention when being assembled with an ink cartridge.

FIG. 1 is a sectional view of the seal part. Two circles of flanges 4 are disposed on a cylindrical surface, so as to seal an ink outlet port 8 (FIG. 2) of an ink cartridge. The reference numeral 6 indicates an end surface b, which is a closed plane. During the assembly, an ink supply needle of the printer passes through the end surface, and extends out from an aperture 2 in the center of the end surface through a cavity 5. The reference numeral 3 indicates an end surface a, the aperture in the end surface a is used to seal the ink supply needle of the printer, and a size of the aperture is adequate to seal the ink supply needle of the printer. A diameter of the cavity 5 inside the seal part 1 is greater than a diameter of the ink supply needle of the printer. When the ink cartridge is detached from the printer, the end surface b is closed automatically, so as to prevent the ink from leaking from the ink outlet port.

Obviously, a material of the end surface b, the closed plane, or at least a portion of the enclosed plane that allows the ink supply needle to pass through is elastic and retractable, for example, is an elastic material such as rubber and silicone, which ensures that when the ink cartridge is detached from the printer, the portion through which the ink supply needle passes is closed automatically, so as to prevent the ink leaking from the ink outlet port.

What is claimed is:

1. A seal part for an ink cartridge, the seal part comprising:

a seal end for sealing an ink outlet port of the ink cartridge, wherein the seal part is column-shaped, a cylindrical cavity exists inside the seal part, and a diameter of the cavity is greater than a diameter of an ink supply needle of the printer, wherein the seal end is cylindrical, an end surface of the seal end is a closed plane for preventing ink from flowing out from the ink outlet port after the ink cartridge is detached from the printer, another end surface opposite to the seal end is a flat plane with an aperture in a center portion of said another end surface, and a size of the aperture is adequate to seal the ink supply needle of the printer, wherein a material of the closed plane or at least a portion of the closed plane that allows the ink supply needle to pass through is elastic and retractable, the seal end for sealing the ink outlet port of the ink cartridge has two circles of sealing flanges on the cylindrical plane, one circle of the sealing flanges is located adjacent to a lower part of the sealing part, and the other one circle of the sealing flanges is located adjacent to an upper part of the sealing part.

2. The seal part for an ink cartridge of an inkjet printer as claimed in claim 1, wherein the seal end is formed integral with the seal part.

3. The seal part for an ink cartridge of an inkjet printer as claimed in claim 1, wherein the seal part has a cylindrical-shaped outer periphery of a constant diameter.

* * * * *